Sept. 5, 1933.  P. C. HERMANN  1,925,872
APPARATUS FOR MAKING MAGNETIC TESTS
Filed Aug. 18, 1932
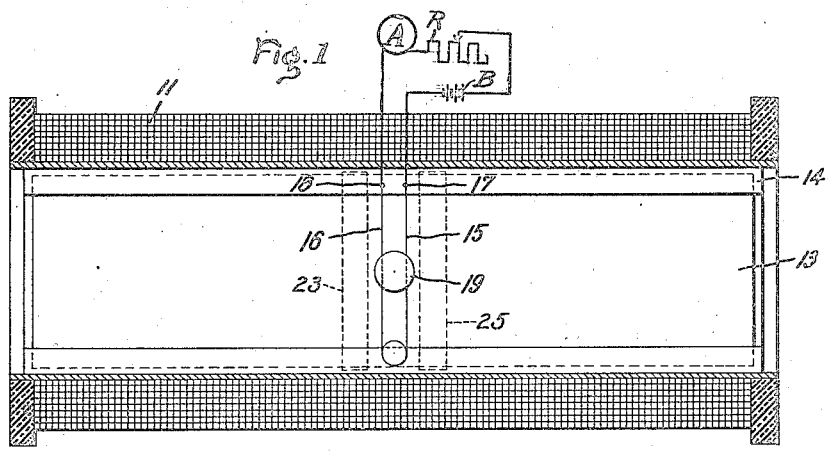
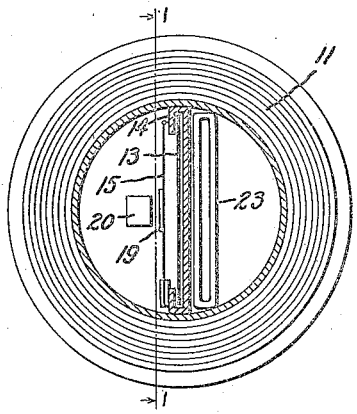
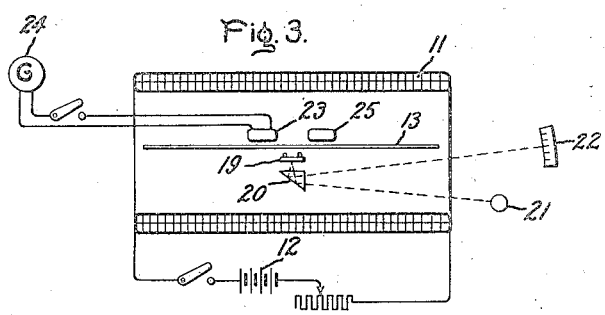
Inventor:
Peter C. Hermann,
by *Charles E. Tuller*
His Attorney.

Patented Sept. 5, 1933

1,925,872

UNITED STATES PATENT OFFICE 1,925,872

APPARATUS FOR MAKING MAGNETIC TESTS

REISSUED

Peter C. Hermann, Berlin-Zehlendorf-Mitte, Germany, assignor to General Electric Company, a corporation of New York Application August 18, 1932, Serial No. 629,369, and in Germany September 1, 1931

5 Claims. (Cl. 175—183)

My invention relates to apparatus for making magnetic tests and measurements and concerns particularly an arrangement suitable for testing different materials under working conditions.

In the laboratory magnetization curves may readily be determined for the purpose of ascertaining the characteristic magnetic constants such as coercive force, remanence, initial and maximum permeability, hysteresis losses and saturation, and the like. Accurate results may be obtained by carrying out the measurements on a closed ring. The laboratory method utilizing a closed ring, however, is not suitable when the tests are to be carried out under working conditions continuously or when it is desired to take repeated measurements on a piece of sheet metal in order to determine the thermal effects, for example.

The necessity for the use of a closed ring has been overcome in certain types of apparatus by building up cores from test strips arranged in layers in a closed form or by utilizing a closing yoke. However, the accuracy of the apparatus and the uniformity of the results is interfered with by the presence of the free poles formed at the abutting joints which tend to demagnetize the magnetic material.

It is an object of my invention to provide an apparatus in which the difficulties of the prior devices are overcome by magnetizing the sample in a free coil and taking a direct measurement of the effective field strength. It is a further object of my invention to provide an apparatus in which tests may be made upon small quantities of test material in shapes that may be obtained easily, particularly flat strips or sheets.

In accordance with my invention in its preferred form the sample in the form of a strip of sheet metal is surrounded by a magnetizing winding. The width of the strip is so great that the effect of any hardening of the edge is negligible. The operation of my device depends upon the principle that the actual effective field strength in the metal strip is just as great as the field strength in the air at the surface of the metal. This law is based upon the continuity of the tangential component of the field strength when passing to the outside layers.

One or two filamentary conductors are mounted in close proximity to the surface of the test strip and the deflection of the filaments when a current is passed through provides an indication of the strength of field at the surface of the magnetic test strip. Any suitable means such as a microscope used to observe the motion of the filaments or a rotating mirror carried by the pair of filaments in the manner of an oscillograph loop may be employed in conjunction with an optical system in order to provide an indication of the bending of the filaments thereby providing an indication of the strength of field. The features of my invention which I believe to be novel and patentable will be pointed out in the claims appended hereto.

For a more complete understanding of my invention reference may be had to the accompanying drawing in which Fig. 1 is a section cut by a plane through the axis of the magnetizing winding; Fig. 2 represents a cross-sectional view; and Fig. 3 is a schematic diagram partly in section of one embodiment of my invention.

Referring now more in detail to the drawing in which like reference characters refer to like parts throughout, I provide a cylindrical magnetizing winding 11 energized by any suitable source of current such as a battery 12. Test piece 13 is placed in magnetic relation to the magnetizing winding 11. Preferably the test piece 13 takes the form of a flat strip supported within the winding 11 by a nonmagnetic frame 14.

In order to provide a direct indication of the field strength within and at the surface of the test piece 13, a current-conducting filament 15 is mounted in close proximity to the surface of the test piece 13. Although I am not limited to this specific arrangement, I prefer to employ a pair of parallel filaments 15 and 16 connected in series at one end. A suitable source of current, such as, for example, a battery B in series with a current-controlling rheostat R and an ammeter A is connected to the terminals 17 and 18 which supply the filaments 15 and 16 with direct current. Current flows in opposite directions in the two filaments so that they are deflected in opposite directions. A mirror 19 is supported by the filaments 15 and 16 and cooperates with a suitable device 20 such as a mirror or prism, a source of light 21 and a scale 22 to provide an indication of the deflection of the filaments 15 and 16 in response to the reaction between the current flowing in the filaments and the magnetic field at the surface of the test piece 13. It will be understood that the current in the filament 15, 16 is maintained at a predetermined value during a reading by means of the rheostat R. The filament 15, 16 is located in a field which is made non-uniform in strength due to the presence of the magnetic test piece 13. Thus the field strength is greater on the side of the filament nearest the test piece and less on the side of the filament away from the test piece. The variation in field strength and resulting deflection of the mirror is proportional to this non-uniformity. The non-uniformity is of course proportional to the field strength at the surface of the test piece 13. Since the field strength of the surface of the test piece 13 is the same as the field strength within the test piece, the deflection of the filaments 15 and 16 provides a direct indication of the field strength. In my apparatus, corrections which would have to be made in calculating the field strength from the magnetizing current are therefore rendered unnecessary.

In order that measurements of the magnetic induction in the iron may also be taken, I provide an induction measuring coil 23 cooperating with a ballistic galvanometer 24 in the customary manner. A compensation coil 25 may in some cases be desirable as when the cross section of the test piece 13 is small compared with the air cross section of the magnetizing winding 11. The induction measurement winding 23 is placed as close as possible to the point at which the field strength is measured so that the induction and the field strength is measured at practically the same point. By this means all faults due to stray fields are avoided and measurements are not taken of average values for the sample which is generally unevenly magnetized, but the measurements are obtained of the actual values for induction and field strength which are associated with one another, in a small portion which may be regarded as being evenly magnetized. Calibration of the field measuring apparatus may easily be carried out at any time by examining the relation of the magnetizing current and the field deflection without any ferro-magnetic material. When the data for the magnetizing coils are taken into consideration, a calibration constant for the apparatus can be obtained.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. Apparatus for making magnetic measurements of magnetic samples having flat surfaces, comprising a magnetizing winding, means for supporting such a sample in testing position in magnetic relation with said winding, a flexible current conductor supported in said winding so as to be parallel with and in relatively close proximity to the surface of a sample in testing position, and means for supplying an electrical current to said conductor to cause a deflection of said conductor and an indication of the strength of the magnetic field in the sample under test.

2. Apparatus for making magnetic measurements of test pieces in the form of flat strips, comprising a magnetizing winding arranged to surround such a test piece, means for energizing said winding, a current conducting filament supported transverse the axis of said magnetizing winding so as to be parallel with and in relatively close proximity to one surface of a piece in testing position, means for supplying an electric current to said filament, said filament being deflected in accordance with the magnetic field strength to which the piece under test is subjected, thereby providing a direct response to the strength of said field.

3. Apparatus for making magnetic measurements of test pieces having flat surfaces, comprising a magnetizing winding arranged to surround such a test piece, means for energizing said winding, a pair of current conducting filaments connected in series supported transverse to the axis of said magnetizing winding so as to be parallel with and in relatively close proximity to the surface of a piece in testing position, said pair of filaments being twisted in accordance with the magnetic field strength to which the test piece is subjected thereby providing a direct response to the strength of said field.

4. Apparatus for making magnetic measurements of magnetic samples having flat surfaces, a magnetizing winding arranged to surround such a sample, means for energizing said winding, a pair of parallel current conducting filaments connected in series supported transverse to the axis of said magnetizing winding so as to be parallel with and in relatively close proximity to one surface of a sample in testing position, means for supplying an electric current to said filaments, a mirror supported by said filaments intermediate their ends, said filaments being oppositely deflected in accordance with the magnetic field strength to which the sample under test is subjected, thereby rotating said mirror in direct response to the strength of said field, and an optical system responsive to the rotation of said mirror.

5. Apparatus for making magnetic measurements of a magnetic sample in the form of a flat strip, a magnetizing winding arranged to surround such a sample, means for energizing said winding, a current conducting filament supported transverse the axis of said magnetizing winding so as to be parallel with and in relatively close proximity to one surface of a sample in testing position, means for supplying an electric current to said filament, said filament being deflected in accordance with the magnetic field strength to which the sample under test is subjected, a straight sided coil supported so as to be in close proximity to the opposite surface of the sample under test with its magnetic axis parallel to the sample and to the axis of said magnetizing winding, means responsive to change in induction through said coil whereby the field strength and the induction in a given portion of a sample may be measured.

PETER C. HERMANN.